United States Patent [19]

Flora

[11] Patent Number: 4,686,677
[45] Date of Patent: Aug. 11, 1987

[54] APPARATUS AND METHOD FOR DETECTING TIME-RELATED FAULTS

[75] Inventor: Laurence P. Flora, Covina, Calif.

[73] Assignee: Unisys Corporation, Detroit, Mich.

[21] Appl. No.: 761,989

[22] Filed: Aug. 2, 1985

[51] Int. Cl.⁴ .......................... G06F 11/00; H03K 5/26
[52] U.S. Cl. ........................................................ 371/61
[58] Field of Search ................... 371/61, 68; 307/527, 307/528

[56] References Cited

U.S. PATENT DOCUMENTS

| | | | |
|---|---|---|---|
| 3,781,795 | 12/1973 | Zegers | 371/68 X |
| 4,267,514 | 5/1981 | Kimsey | 307/528 X |
| 4,291,274 | 9/1981 | Suzuki | 307/528 X |
| 4,362,957 | 12/1982 | Stern | 371/61 X |
| 4,422,176 | 12/1983 | Summers | 307/527 X |

Primary Examiner—Jerry Smith
Assistant Examiner—Robert W. Beausoliel, Jr.
Attorney, Agent, or Firm—Nathan Cass; Kevin R. Peterson; Edmund M. Chung

[57] ABSTRACT

On-line timing signal fault detection is provided by taking advantage of differential signal distribution commonly employed in digital data processing systems. An acceptance window indicative of permissible phase shift variations between the differential signals is established using a plurality of flip-flops having clock and data inputs to which delayed, undelayed, inverted and uninverted versions of the differential signals are applied in a predetermined manner. Also included is the capability of providing fault detection even when one of the differential signals is lost.

10 Claims, 16 Drawing Figures

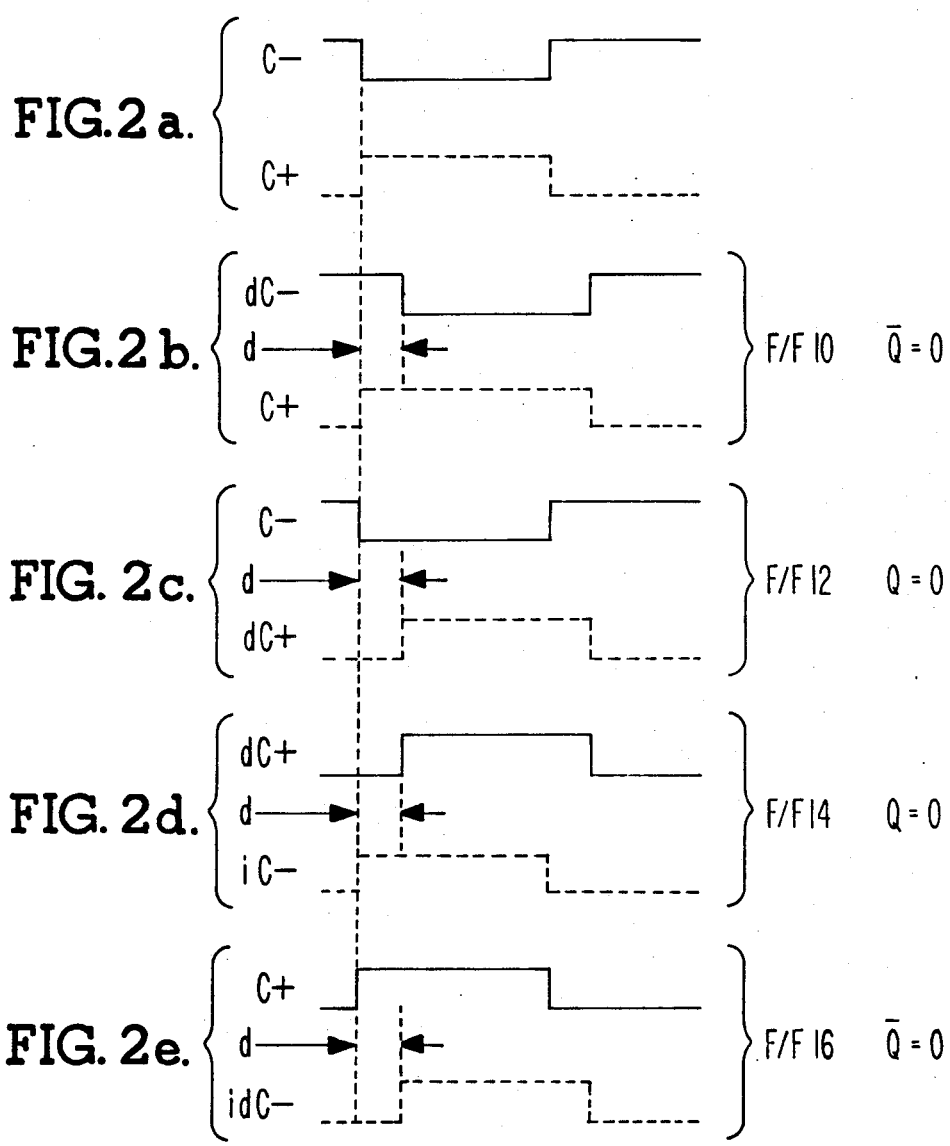

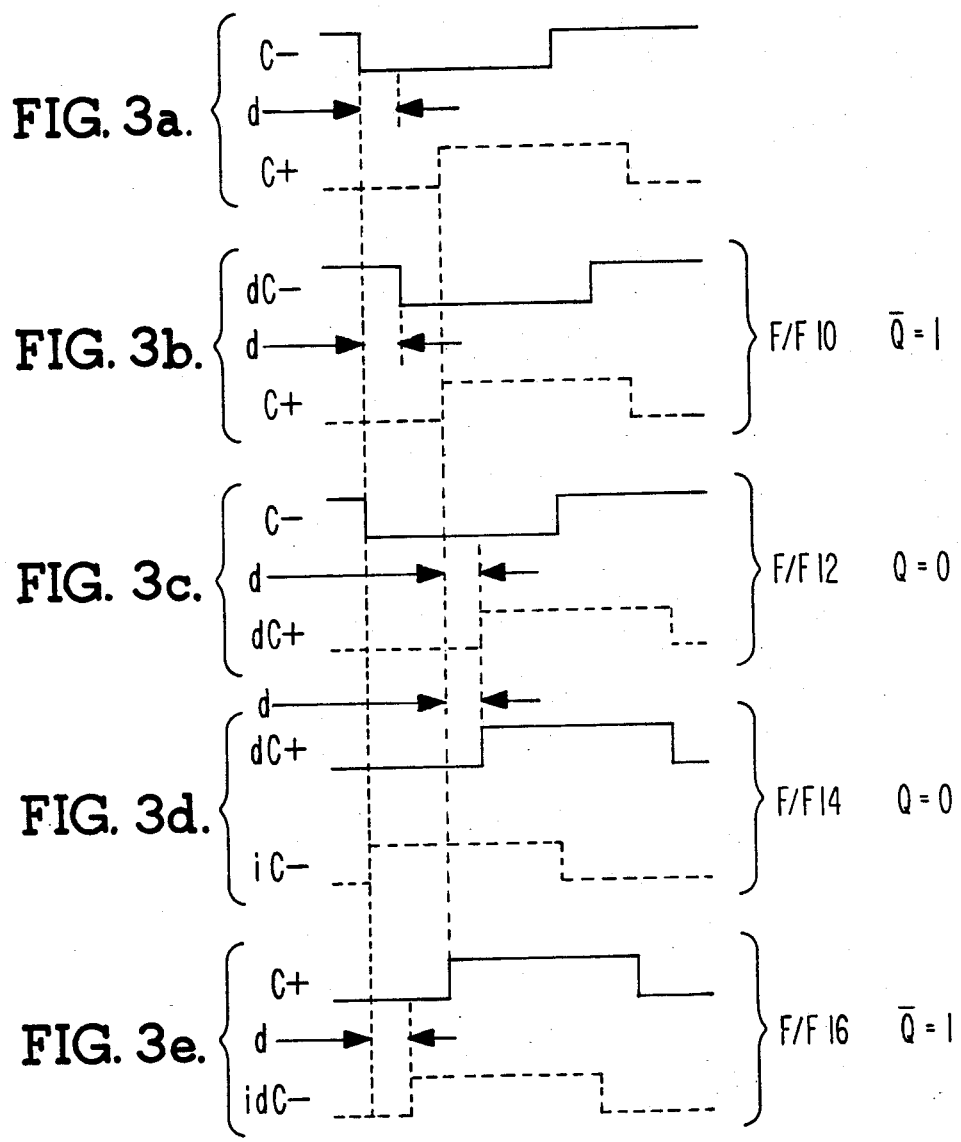

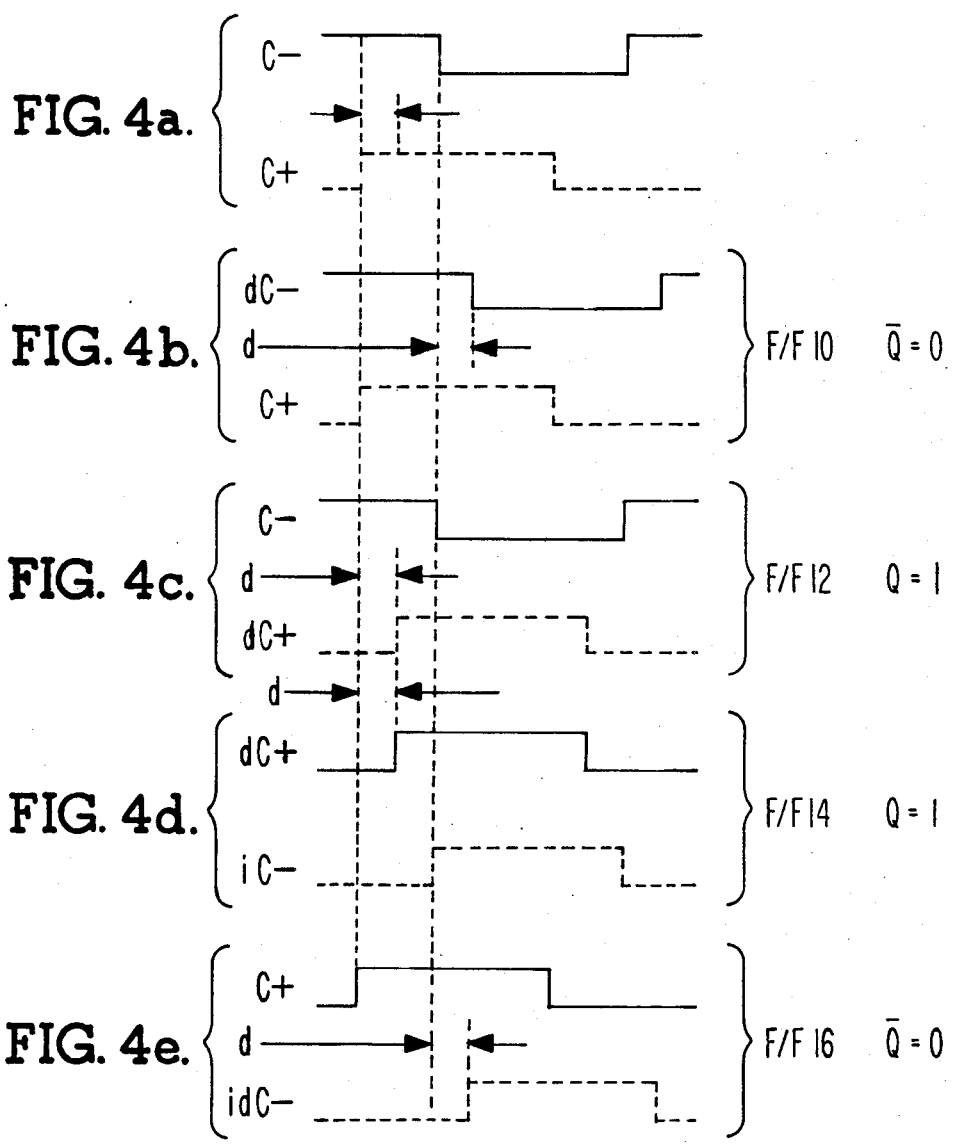

APPARATUS AND METHOD FOR DETECTING TIME-RELATED FAULTS

BACKGROUND OF THE INVENTION

This invention relates generally to improved means and methods for providing fault detection in data processing systems, and particularly with regard to detecting faults related to signal timing variations.

The detection of timing variation faults which could produce errors, particularly in clock generation and distribution circuitry, presents a particularly difficult problem. Typically, testing for such faults is provided off-line, since the provision of known on-line fault detecting circuitry for this purpose (in order to provide fault detection during actual operation) has been found to not only be expensive, but also to undesirably increase circuit complexity, and may additionally degrade operating speed.

SUMMARY OF THE PRESENT INVENTION

It is accordingly a broad object of the present invention to provide improved on-line fault detection means and methods for use in a data processing system.

A more specific object in accordance with the foregoing object is to provide for the on-line detection of faults related to signal timing variations.

A still more specific object of the invention in accordance with the foregoing objects is to provide improved means and methods for providing for highly accurate on-line detection of clocking signal faults.

An additional object of the invention is to provide for implementing the foregoing objects in a relatively simple and economical manner.

In a particular preferred embodiment of the invention directed to the detection of clock signal faults, the above objects are accomplished by taking advantage of the differential signal distribution design commonly employed in many clock distribution systems for such purposes as providing high speed operation, reducing electromagnetic radiation, and increasing noise immunity. In this particular preferred embodiment, the already available differential signal design is employed for the additional purpose of providing on-line clock fault detection, whereby very accurate high-speed, on-line fault detection of distributed clock signals is simply provided at low cost.

The specific nature of the invention as well as other objects, advantages, uses and features thereof will become evident from the following description in conjunction with the accompanying drawings.

BRIEF DESCRIPTION OF THE DRAWINGS

FIGS. 2a-2e are graphs illustrating the operation of FIG. 1 when the differential clock signals C+ and C− are in phase.

FIGS. 3a-3e are graphs illustrating the operation of FIG. 1 for the condition where the clock signal C− lags the clock signal C+ by more than the prescribed delay "d".

FIGS. 4a-4e are graphs illustrating the operation of FIG. 1 for the condition where the clock signal C− leads the clock signal C+ by more than the prescribed delay "d".

DETAILED DESCRIPTION OF THE INVENTION

Figure 1:
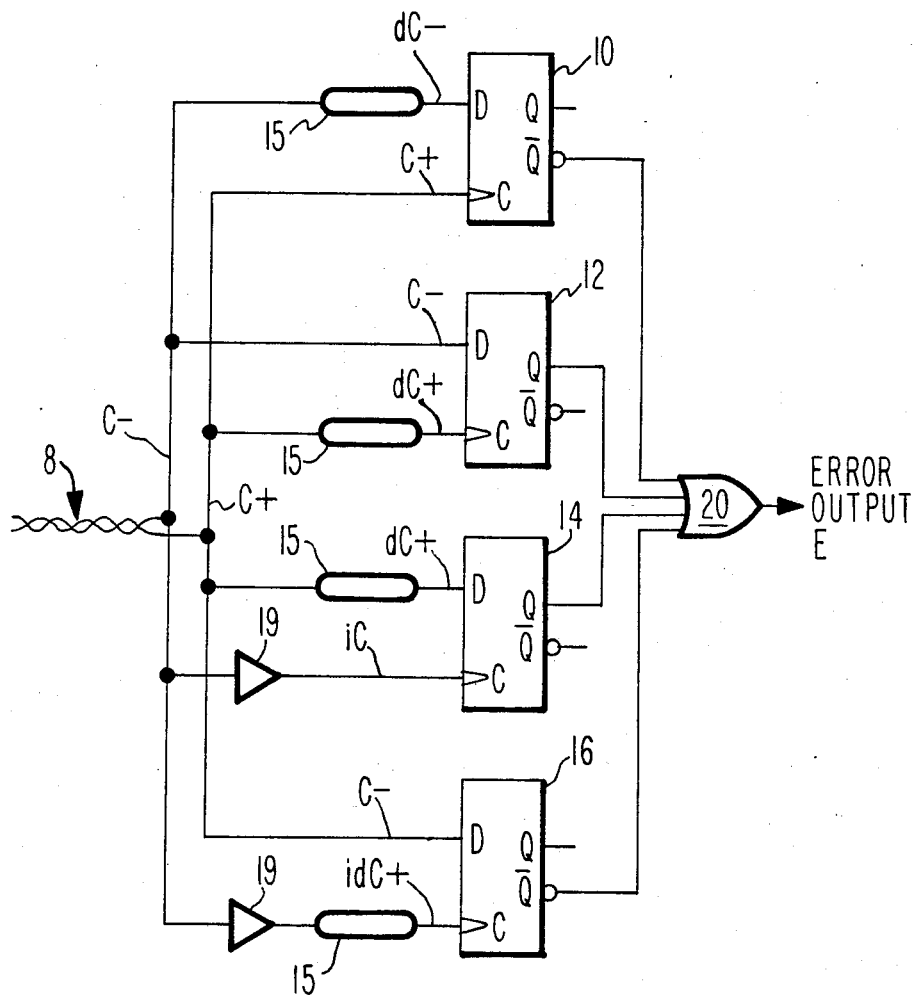
FIG. 1 is a schematic electric diagram illustrating a particular preferred embodiment of the invention.

Like numerals and characters refer to like elements throughout the drawings.

Before describing the particular preferred embodiment which will be employed herein to illustrate the invention, it will be helpful to provide some initial background comments with regard to the provision of fault detection in clock generating and distributing systems.

As is well known, in a clocked sequential digital data processing system, a clock signal is usually distributed to every element capable of holding state (such as flip-flops). Ideally, this clock signal should arrive at every destination simultaneously for proper system functioning. Since this is impossible in the absolute sense, a number of problems can occur.

First, the maximum possible skew between clock arrival at two different flip-flops must be added to the minimum clock cycle time, degrading the speed of operation. Second, if the maximum skew is as large as the minimum delay from the output of one flip-flop to the input of another, a problem known as "race" occurs. Although known race problems can usually be fixed, the solution usually increases system complexity and cost, and may also degrade system speed. Worse, race problems which are unknown to the designer may turn up during manufacture of subsequent systems or during use by the end user, degrading system reliability. Problems such as these make it readily apparent why the provision of fault detection is important in clock generation and distribution systems.

However, one of the most difficult areas in which to provide fault detection is in clock generation and distribution circuitry. In order to guarantee that a digital system will function correctly as long as no errors are reported by the embedded fault detection mechanisms, it is necessary that the range of correct operation of the system include the worst possible range of accuracy of the fault detection mechanisms. For clock systems this means the clock generation and distribution system must be allowed to degrade up to the point of the worst possible resolution of the error detection mechanism while proper operation of the entire system continues. Thus, the maximum skew used in system speed calculations becomes the resolution of the fault detection mechanism instead of the expected maximum skew of the generation/distribution system. Unfortunately, this value can be very large.

It should thus be evident that, for a clock generation and distribution system, the fault detection provided should not only be very accurate, but should also be implementable at sufficiently low cost to permit incorporation into high-speed fault-tolerant digital systems so that fault detection can be performed on line (that is, during actual system operation).

In many modern day clocked digital data processing systems, differential signal distribution is provided for a variety of reasons, such as for providing higher speed operation, for reducing electromagnetic radiation, and for increasing noise immunity. As is well known, a differentially distributed signal is a signal which is distributed accompanied by a like signal of opposite polarity. Such differential signal distribution is commonly employed in clock generation and distribution systems. In such a case, the clock is distributed using a pair of clock lines having like clock signals of opposite polarity. FIG. 1 is a particular preferred embodiment of the invention which illustrates how advantage may be taken of an existing differential clock distribution system to provide highly acccurate on-line detection of clock faults.

As illustrated in FIG. 1, a differential pair of clock lines, indicated by numeral 8, provides a positive polarity clock signal C+ on one line and a negative polarity clock signal C− on the other line, as typically illustrated in FIG. 2a. In many modern day digital computer systems, it is important that these opposite polarity clock signals C+ and C− always be in phase to a very high degree of accuracy. The particular preferred embodiment illustrated in FIG. 1 provides for highly accurate on-line detection of when the phase difference between the clock signals C+ and C− exceeds a prescribed amount. For example, in a system employing ECL integrated circuits, the maximum amount by which the phase of the clocks C+ and C− can differ is typically one-half of a nanosecond.

The embodiment illustrated in FIG. 1 includes four like flip-flops 10, 12, 14 and 16, each having a clock input C, a data input D, an output Q and an inverse output $\overline{Q}$. As is typical, each flip-flop operates in response to the positive edge of a signal applied to its clock input C to provide signals on outputs Q and $\overline{Q}$ indicative of the logical level of the signal applied to its data input D at that time. For example, if the signal applied to the data input D is "1" or "true" when the positive edge of a signal applied to the clock signal occurs, then the Q flip-flop output will provide a "true" or "1" output signal, while the $\overline{Q}$ flip-flop output will provide a "false" or "0" output signal, and "vice versa" when the signal applied to the data input D is "0" or "false".

As shown in FIG. 1, for flip-flop 10, the C+ signal is directly applied to the flip-flop clock input C, while the C− signal is applied to the flip-flop data input D via a delay element 15. For flip-flop 12, the C+ signal is applied to the clock input C via a like delay element 15, while the C− input is directly applied to the data input D. For the flip-flop 14, the C+ signal is applied to the clock input C via a like delay element 15, while the C− signal is applied to the data input D via an inverter 19. For flip-flop 16, the C+ signal is directly applied to the data input D, while the C− signal is applied to the clock input C via a like inverter 19 and a like delay element 15.

As further shown in FIG. 1, an OR gate 20 receives the Q outputs from flip-flops 12 and 14 and the $\overline{Q}$ outputs from flip-flops 10 and 16, whereby the output of OR gate 20 will be "true" or "1" whenever the phase difference between C+ and C− is greater than the delay provided by the delay element 15. Accordingly, in the particular preferred embodiment illustrated in FIG. 1, each delay element 15 is chosen to provide an accurate delay equal to the maximum phase difference which is to be permitted to occur between the differential clock signals C+ and C−. The presence of a "true" or "1" signal at the output of OR gate 20 during operation will thus indicate a clock fault.

The operation of FIG. 2 will now be explained with reference to the graphs of FIGS. 2a–2e, FIGS. 3a–3e, and FIGS. 4a–4e. In these figures, a solid line representation of a signal indicates that it is applied to a flip-flop data input D, and a dashed line representation indicates that it is applied to a flip-flop clock input C. Also, the delays shown in these figures are exaggerated for greater clarity.

Referring initially to FIGS. 2a–2e, these figures illustrate the differential clock signals C+ and C− for the condition where there is no phase difference therebetween as shown in FIG. 2a. FIG. 2b illustrates the signals dC− and C+ respectively applied to the data and clock inputs D and C of flip-flop 10, FIG. 2c illustrates the signals C− and dC+ respectively applied to the D and C inputs of flip-flop 12, FIG. 2d illustrates the signals dC+ and iC− respectively applied to the D and C inputs of flip-flop 14, and FIG. 2e illustrates the c+ and idC− signals applied to the D and C inputs of flip-flop 16. A "d" preceding a clock signal C+ or C− indicates that the signal has been delayed by the delay element 15, an "i" indicates that the clock signal has been inverted by the inverter 19, and an "id" indicates that the clock signal has been both inverted and delayed. The delay introduced by each delay element 15 in FIG. 1 is indicated in FIGS. 2a–2e by the time period labeled "d".

It will be understood from FIGS. 2a–2e that, for the in-phase condition of C+ and C− illustrated therein, the $\overline{Q}$ outputs of flip-flops 10 and 16 will be "0", while the Q outputs of flip-flops 12 and 14 will also be "0", in which case the output E of OR gate 20 (which receives these outputs) will also be "0", thereby indicating that the phase difference between clocks C+ and C− is within the delay "d" prescribed by the delay elements 15 in FIG. 1.

FIGS. 3a–3e and FIGS. 4a–4e correspond to FIGS. 2b–2e, respectively, except that FIGS. 3a–3e illustrate the condition where C− leads C+ by more than the prescribed delay "d" (see FIG. 3a), while FIGS. 4a–4e illustrate the condition where C− lags C+ by more than the prescribed delay "d" (see FIG. 4a). As illustrated in these figures, when C− leads C+ by more than the prescribed delay "d" (as illustrated in FIGS. 3a–3e), the $\overline{Q}$ outputs of flip-flops 10 and 16 will be "1", causing a "1" to be produced at the output of OR gate 20 (to thereby indicate an error); and when C− lags C+ by more than the prescribed delay "d" (as illustrated in FIGS. 4a–4e), the Q outputs of flip-flops 12 and 14 will be "1", causing a "1" to be produced at the output of OR gate 20 (to thereby indicate an error).

It will thus be understood that flip-flops 10 and 16 in FIG. 1 serve to determine when C− leads C+ by more than the prescribed delay "d", while flip-flops 12 and 14 determine when C− lags C+ by more than the prescribed delay "d", thereby establishing a window of acceptability for phase differences between C+ and C−. Although only one pair of flip-flops (10 and 12 or 14 and 16) is required to establish this window, the provision of the additional pair of flip-flops offers the important advantage of guaranteeing that an error will be produced at the output of OR gate 20 even if one of the clock signals C+ or C− should be lost. For example, if only flip-flops 10 and 12 were employed in FIG. 1 and signal C+ (which feeds the clock input C of these flip-flops) were to be lost at a time when the outputs of these flip-flops were not indicating an error, they would continue to indicate no error even though C+ was lost. However, by also providing the pair of flip-flops 14 and 16 (which are clocked by the C− signal which is not lost), an error would still be indicated at the output of OR gate 20.

Although the present invention has been described with reference to a particular preferred embodiment, it is to be understood that various modifications in construction, arrangement and use are possible without departing from the true scope and spirit of the present invention. For example, the invention is also applicable for providing fault detection for other types of differential signals besides clock signals. Also, where different leading and lagging tolerances are desired, different delays could be provided for the delay elements 15 in FIG. 1. Accordingly, the present invention is to be considered to emcompass all possible modifications and variations coming within the scope of the appended claims.

What is claimed is:

1. Fault detection means comprising:
   differential signal means providing a pair of differential digital signals;
   a plurality of bistable means each having a data input, a clock input and at least one output, each bistable means being operative in response to a predetermined change in a signal applied to its clock input to provide a signal at its output indicative of the logical level of the signal applied to its data input when said predetermined change occurs;
   coupling means coupling said pair of differential digital signals to the clock and data inputs of each bistable means such that the differential signal applied to one input is delayed by a predetermined amount and in a predetermined direction relative to the differential signal applied to the other input, the coupling provided by said coupling means being chosen so that the signals produced at the outputs of said bistable means are indicative of whether the phase difference between said differential signals is within prescribed limits determined by said predetermined amount and said predetermined direction; and
   logical circuit means to which the outputs from said bistable means are applied for producing a fault signal when the phase difference between said differential signals exceeds said prescribed limits.

2. The invention in accordance with claim 1, wherein said coupling means and said plurality of bistable means are chosen in conjunction with said logical circuit means so that said logical circuit means produces a fault signal even when one of said differential signals is lost.

3. The invention in accordance with claim 1, wherein said plurality of bistable means includes first and second bistable means, wherein one differential signal is coupled to the data inputs of said first and second means and the other differential signal is coupled to the clock inputs of said first and second bistable means, and wherein said coupling means causes the differential signals coupled to the inputs of said first bistable means to have a relative delay which is in an opposite direction with respect to the relative delay of the differential signals coupled to the inputs of said second bistable means.

4. The invention in accordance with claim 3, wherein said plurality of bistable means additionally includes third and fourth bistable means and wherein said coupling means couples said differential signals to the inputs of said third and fourth bistable means in a like manner and with the same opposite relative delay relationship as provided for said first and second bistable means except that said one differential signal is inverted and coupled to the clock inputs of said third and fourth bistable means while said other differential signal is coupled to the data inputs of said third and fourth bistable means.

5. The invention in accordance with claim 3, wherein said coupling means includes first and second delay means, wherein said one differential signal is coupled to the data input of said first bistable means via said first delay means, and wherein said other differential signal is coupled to the clock input of said second bistable means via said second delay means.

6. The invention in accordance with claim 5, wherein said plurality of bistable means additionally includes third and fourth bistable means, wherein said coupling means additionally includes third and fourth delay means and first and second inverter means, wherein said one differential signal is coupled to the clock inputs of said third and fourth bistable means, wherein said other differential signal is coupled to the data inputs of said third and fourth bistable means, wherein said one differential signal is coupled to the clock input of said third bistable means via said first inverter means and to the data clock input of said fourth bistable means via said second inverter means and said fourth delay means, and wherein said other differential signal is coupled to the data input of said third bistable means via said third delay means and to the data input of said fourth bistable means.

7. The invention in accordance with claim 6, wherein all of said delay means are substantially equal.

8. The invention in accordance with claim 7, wherein said differential signals are clock signals.

9. A method for detecting timing faults in a binary signal, said method comprising the steps of:
   providing a pair of differential binary signals corresponding to said binary signal wherein each of said differential signals changes between a first logical level and a second logical level;
   delaying said differential signals so as to produce first, second, third and fourth binary signals such that said first and second binary signals have a relative delay therebetween in one direction and said third and fourth binary signals have a relative delay therebetween in an opposite direction;
   detecting the phase relationship between the logical levels of said first and second binary signals in response to the logical levels thereof at a predetermined time and producing a first output binary signal in response thereto;
   detecting the phase relationship between the logical levels of said third and fourth binary signals in response to the logical levels thereof at a predetermined time and producing a second output binary signal in response thereto; and
   logically combining said first and second output signals to produce an error indication when the phase difference between said pair of differential signals exceeds a prescribed amount determined by the amount of delay produced by the aforementioned steps of delaying.

10. In a data processing system, the combination comprising:
   means providing a binary clock signal;
   means for distributing said binary clock signal in a differential manner as first and second differential binary clock signals;
   a first line for receiving said first binary differential clock signal;
   a second line for receiving said second binary differential clock signal;
   on-line fault detection means coupled to said first and second lines for detecting unacceptable timing variations in said differential binary clock signals thereon;

said on-line fault detection means including time comparison means coupled to said first and second lines for comparing the timing of each of said binary differential clock signals with respect to the other;
said on-line fault detection means also including fault indicating means responsive to said comparing for providing a fault indication when either comparison is greater than a predetermined amount.

* * * * *